(12) United States Patent
Rumpel et al.

(10) Patent No.: US 6,787,774 B1
(45) Date of Patent: Sep. 7, 2004

(54) COROTRON COMPRISING A FIXING ELEMENTS ON SUPPORTS, AN ASSEMBLY WITH A POWER SUPPLY UNIT AND AN ASSEMBLY FOR REPLACING A COROTRON WIRE

(75) Inventors: Peter Rumpel, Feldkirchen (DE); Hartmut Gack, Munich (DE)

(73) Assignee: Océ Printing Systems GmbH, Poing (DE)

(*) Notice: Subject to any disclaimer, the term of this patent is extended or adjusted under 35 U.S.C. 154(b) by 0 days.

(21) Appl. No.: 10/148,377
(22) PCT Filed: Nov. 30, 2000
(86) PCT No.: PCT/EP00/12045
§ 371 (c)(1), (2), (4) Date: Jul. 25, 2002
(87) PCT Pub. No.: WO01/40880
PCT Pub. Date: Jun. 7, 2001

(30) Foreign Application Priority Data

Nov. 30, 1999 (DE) .......................................... 199 57 615

(51) Int. Cl.⁷ ............................................... G03G 15/02
(52) U.S. Cl. ......................... 250/325; 250/324; 250/326
(58) Field of Search ................................. 250/324, 325, 250/326

(56) References Cited

U.S. PATENT DOCUMENTS

| | | | |
|---|---|---|---|
| 3,685,895 A | 8/1972 | Wright, Jr. et al. | |
| 4,258,258 A | 3/1981 | Laing et al. | |
| 5,128,720 A | 7/1992 | Creveling | |
| 5,216,465 A | * 6/1993 | Arai et al. | ..................... 399/90 |
| 5,335,050 A | 8/1994 | Osbourne et al. | |
| 5,449,906 A | 9/1995 | Osbourne | |
| 5,666,605 A | * 9/1997 | Tokimatsu et al. | .......... 399/173 |

FOREIGN PATENT DOCUMENTS

| | | |
|---|---|---|
| DE | 40 02 639 | 1/1990 |
| DE | 42 24 573 | 7/1992 |
| EP | 0 871 081 | 10/1998 |

OTHER PUBLICATIONS

Patent Abstracts of Japan—Publication No. 57029058—Feb. 16, 1982 Fuji Xerox Co Ltd.
Patent Abstracts of Japan—59218467—Dec. 8, 1984 Fuji Xerox Co Ltd.
Patent Abstracts of Japan—01179960—Jul. 18, 1989 Konica Corp.
Patent Abstracts of Japan—05127489—May 25, 1993.
Patent Abstracts of Japan—08146715—Jun. 7, 1996 Canon Inc.
Patent Abstracts of Japan 09068848 Mar. 11, 1997.
Patent Abstracts of Japan 58193560—Nov. 11, 1983 Fuji Xerox Co Ltd.

* cited by examiner

Primary Examiner—John R. Lee
Assistant Examiner—James J. Leybourne
(74) Attorney, Agent, or Firm—Schiff Hardin LLP

(57) ABSTRACT

The corotron wire of a corotron device is introduced with a retainer element, such as in a printer or copier. At least one corotron wire is held by the retainer element and the carrier material for a latent image residing there opposite is conducted past the corotron wire. The carrier material and the corotron wire lie in planes arranged substantially parallel to one another. The retainer element lies on bearings at at least two bearing points, the bearings being rigidly connected to the guide element and pressed onto the bearings with a spring power. A method is also provided for introducing the corotron wire of a corotron device with assistance of the retainer element.

39 Claims, 13 Drawing Sheets

COROTRON COMPRISING A FIXING ELEMENTS ON SUPPORTS, AN ASSEMBLY WITH A POWER SUPPLY UNIT AND AN ASSEMBLY FOR REPLACING A COROTRON WIRE

BACKGROUND OF THE INVENTION

The invention relates to a corotron for electrographic processes, particularly in a printer or copier. Such a corotron serves the purpose of electrically charging a carrier material for a latent image, particularly of a photoconductor band. The invention also relates to an arrangement for a corotron, a corotron device, into which a corotron wire can be introduced with the assistance of a retainer element, as well as to a retainer element for the acceptance of a corotron wire.

The demands made of the technical performance of printing and copying methods make it necessary to precisely adjust the individual elements of the printer and copier device. In order, for example, to effectively design the electrical charging of carrier material with a charging corotron, the distance between the corotron wire and the carrier material should be small. Slight deviations in the parallelism of the plane of the carrier material and the longitudinal axis of the corotron wire cause a non-uniform charging of the carrier material, which leads to a non-uniform formation of the print image. Influencing factors for the uniform charging of the carrier material include the deviation from the parallelism and the overall spacing between corotron wire and carrier material. When reducing the distance between corotron wire and carrier material, the deviation has an increasingly unbeneficial effect on the quality of the print image.

U.S. Pat. Nos. 5,449,906 and 4,258,258 disclose arrangements that contain a corotron wire unit for an electrographic printer or copier device. The corotron wire is provided with end pieces, whereby the corotron wire is arranged in an insert that contains a reflector element and an electrical terminal post. As a result of this arrangement, there is the possibility of easily replacing the corotron wire together with the insert. Given a slight spacing between corotron wire and carrier material, however, it is absolutely necessary that the corotron wire together with the insert be newly aligned relative to the carrier material after the replacement in order to exactly set the parallel alignment of the longitudinal axis of the corotron wire relative to the plane of the carrier material. This activity requires qualified service personnel.

U.S. Pat. No. 5,449,906 discloses an arrangement with which it is possible to insert corotron wires into a corotron arrangement. The corotron wire is secured to a retainer element with resilient clamps. Together with the retainer element, the corotron wires are introduced into the corotron arrangement wherein resilient clamps are likewise provided. Upon introduction, the corotron wire is partly embraced by the clamps of the retainer element and by the clamps of the corotron arrangement. The clamps of the corotron arrangement exert a greater force on the corotron wire than the clamps of the retainer element, so that the clamps of the retainer element detach from the corotron wire when the retainer element is removed from the corotron arrangement. The corotron wire remains in the corotron arrangement and the introduction event has been ended. A removal of the corotron wire from the corotron arrangement is not possible with this retainer element. The removal of the corotron wire is only possible by means of mechanical influence on the corotron wire and/or on the fastening elements thereof. The corotron wire can break in this procedure. Precisely given glass-clad corotron wires, this represents a considerable injury risk for the person implementing the action.

U.S. Pat. No. 3,685,895 discloses a frame for the electrostatic charging of a carrier material wherein corotron wires are seated in blocks. The blocks are arranged within an arm movable over the carrier material. The arm is moved along over the carrier material along the right edge and left edge of the frame. A voltage supply unit for supplying the corotron wires is provided on the movable arm.

The English abstract of JP-A-01-179 960 discloses a frame for holding a corotron wire that is vertically introducible into an image generating device. The feed of the supply voltage of the corotron wire from a power supply unit to the frame ensues with the assistance of plug-type connectors.

SUMMARY OF THE INVENTION

An object of the invention is to specify a simple structure for a corotron wherein the corotron wire proceeds parallel to the carrier material with high precision.

In the invention, a corotron wire of a corotron device, such as in a printer or a copier, is introduced with the assistance a retainer element. The retainer element is detached from the corotron wire after insertion of the corotron wire. The retainer element is removed from the corotron device. At least one end of the corotron wire is arrested in the corotron device. After the insertion of the corotron wire, the retainer element reconnects with the corotron wire. The arrest of the corotron wire and the corotron device is released. The corotron wire with the retainer element is removed from the corotron device.

In a corotron for electrographic processes such as in a printer or a copier, at least one corotron wire is held by a retainer element and a carrier material is conducted past for a latent image residing their opposite. A guide element with which the carrier material is guided is provided. The carrier material and corotron wire lie in planes arranged substantially parallel to one another. The retainer element lies on bearings at at least two bearing points, the bearings being rigidly connected to the guide element and being pressed onto the bearings with a spring power.

DESCRIPTION OF THE PREFERRED EMBODIMENTS

Figure 1:
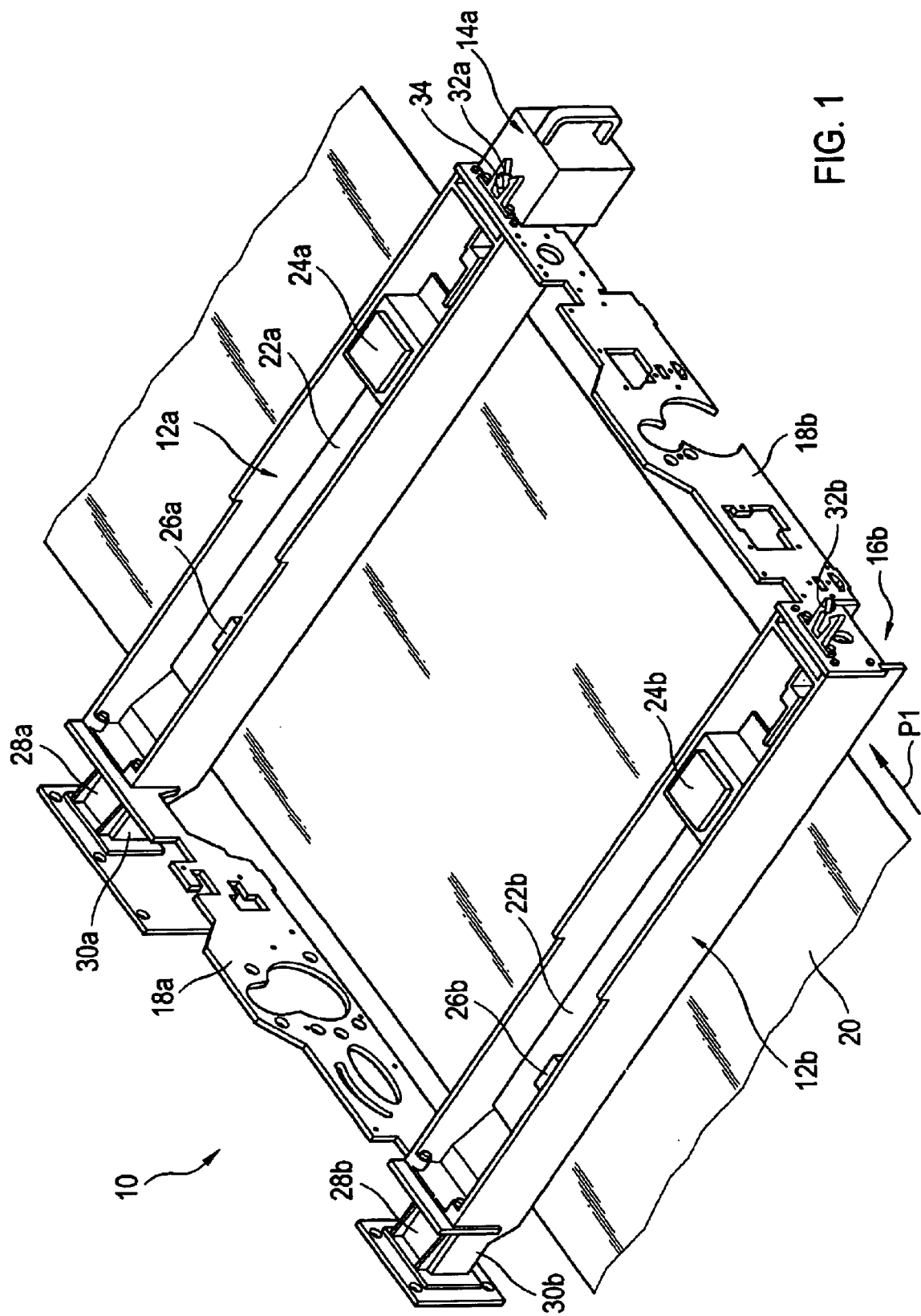
FIG. 1 is a swiveling carrier with two corotron arrangements, whereby a corotron wire insert is installed in one corotron arrangement.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates With the disclosed corotron, at least one corotron wire is held by a retainer element positioned opposite a carrier material for a latent image, whereby the carrier material is guided by a guide element, carrier material and corotron wire which lie in surfaces arranged substantially parallel to one another, and whereby the retainer element lies on bearings at at least two bearing points, the bearings being rigidly connected to the guide element. What is thereby achieved is that the retainer element and, thus, the corotron wire as well are arranged at a constant distance from the carrier material. After the assembly of the printer or copier has been carried out, the guide element serves the retainer element as a bearing. This retainer element is seated on the guide element and is thus always correctly aligned relative to the carrier material. A readjustment is not required.

In one embodiment, the retainer element is guided by guide elements, whereby the guide elements and the retainer element have play in the direction of the carrier material. The retainer element lies on bearing points that are arranged at both sides of the carrier material. What is thereby achieved is that the retainer element is arranged in the printer or copier by means of these guide elements but has enough motion latitude in the direction of the carrier material so that it is seated on bearings at both sides of the carrier material and, thus, is aligned parallel to the carrier material.

In an advantageous embodiment, the retainer element is pressed against the bearing with a spring and is fixed by the spring power in a parallel plane relative to the carrier material. An electrical connection to a voltage supply unit or to the ground of the printer or of the copier is also produced via the spring. What is thereby achieved is that the retainer element is sure to be fixed on the bearing even given mechanical influences, and that a short and cost-beneficial electrical connection to the retainer element is produced. In another advantageous development, the retainer element is guided by guide elements in a carrier, whereby the carrier is arranged in a pivotable arrangement. What the pivotable arrangement achieves is that the printer or copier is constructed maintenance-friendly, that elements of the printer or copier can be pivoted into or can be lifted off into a maintenance position, and that the retainer element is again exactly aligned relative to the carrier material when pivoted back into the working position.

In another embodiment, an arrangement is provided for a corotron for electrophotographic processes, particularly in a printer or copier, having a carrier in which a corotron wire is arranged with an electrical high-voltage and having at least one voltage supply unit that generates the high-voltage, whereby the carrier accepts the voltage supply unit. What is achieved is that the individual elements are arranged in compact fashion, and that the paths of the high-voltage lines are minimized. The disturbing influences due to a stray electrical field on the carrier material are consequently slight.

In one embodiment, at least one corotron wire insert is arranged in the carrier, at least one corotron wire being arranged in the insert, and particularly up to three corotron wires are arranged therein. What the modular structure of the printer or copier achieves is that a maintenance-friendly arrangement is established that makes it possible to remove the corotron wire insert from the printer or copier in order, for example, to implement a replacement of the corotron wires, outside the printer or copier. However, there is also the possibility of replacing entire corotron wire inserts during service jobs in order to reduce standstill times. As a result of a variable arrangement of up to three corotron wires per corotron wire insert, the adaptation of a corotron insert to various printers or copiers is established. As needed, a plurality of corotron wire inserts can also be arranged in the moving direction of the carrier material in order to intensify the charging or discharging of the carrier material.

In another embodiment, the voltage supply unit is arranged in a parallel plane of the corotron wire insert. What this achieves, is that the voltage supply unit is arranged in the immediate proximity of the corotron wire insert and, thus, disturbing influences due to the voltage supply unit are slight. The effect of the stray electrical field of the voltage supply unit of the carrier material is alleviated by elements between the voltage unit and the carrier material, particularly by an electrically conductive reflector.

In one development, the corotron wire insert contains at least one reflector element that, in particular, is designed as part of a hard-chrome plated extruded aluminum profile that is isolated from the potential of the housing by means of electrically insulating elements. What is thereby achieved is that the ionization cloud is reflected by the reflector in the direction of the carrier material and thereby intensifies the charging of the photoconductor band. An effective corrosion protection of the reflector element is established by employing a hard-chrome plated extruded aluminum profile. Moreover, it is also possible to apply the isolated reflector element to a predetermined potential in order to enhance the reflectivity of the reflector.

In another development, the reflector element designed as an extruded profile contains slots through which an ozone-air mixture arising in the corotron device is extracted. The extraction of the ozone-air mixture can occur via a channel that is formed by the reflector element with its side facing away from the corotron wire and by the carrier. The channel is connected via connector elements to an ozone neutralizing unit.

Dependent on the embodiment of the connector elements, these have their contacting surfaces designed such that, particularly by means of a mutual overlap, they assure an adequate tightness or additional seal elements are arranged at the contacting surfaces of the connector elements. What results is that the ozone that arises and is harmful to man is dependably eliminated and a risk to humans is precluded.

In one embodiment, the longer of the two parallel sides of the trapezoidal cross-section of the first connector element is recessed such that the second connector element can be inserted into the first connector element on the overlap length. The trapezoidal cross-sections, which preferably have a constant wall thickness and the shape of an equal lateral trapezoid, are matched to one another such that the inside surfaces of the first connector element and. the outside surfaces of the second connector element form seal surfaces. These seal surfaces touch in the operating attitude and thus seal the connector elements relative to one another. The symmetry axes of the two trapezoidal cross-sections thereby lie on a straight line. A centering of the two connector elements given mutual approach of the two connector elements on their symmetry axes occurs by means of the slanting lengths.

In another development, each corotron wire insert is supplied by a separate voltage supply unit that contains at least two power pack parts, whereby one power pack part generates a voltage, preferably in the range from 16 through 20 kV with a frequency in the range from 3 through 5 kHz, for supplying the corotron wire and a second power pack part generates a DC voltage, preferably in the range from 3 through 5 kV, for supplying the reflector. What these techniques achieve is that each corotron wire insert is separately supplied, as a result of which the conductive paths with lines carrying high-voltage are minimized. As a result of this arrangement, the combination of a plurality of corotron wire inserts can occur in an uncomplicated way dependent on the requirements in the printer or copier. Manufacture and service are greatly simplified as a result of the identical corotron wire inserts in the printer or copier as well as in different printers and copiers, and warehousing is reduced.

In one exemplary embodiment, at least one distributor element is attached to each corotron wire insert. This distributor elements serves, on the one hand, as a mechanical fastening element for manipulating the corotron wire insert and, on the other hand, as an insulated plug-type connector for connecting the voltage supply unit to the corotron wire. The plug-type connector is movably arranged at the voltage supply unit and/or at the distributor element. It is a preferred possibility to resiliently support the plug-type connector. What is thereby achieved is that the corotron wire insert is not rigidly connected to the carrier. The self-alignment of the corotron wire insert is not impeded by the plug-type connector.

In another advantageous development, the carrier comprises an insulating plastic and has a H-shaped cross-section. The voltage supply unit is arranged in the first rectangular recess of the H-shaped profile and the corotron wire insert is arranged in the second rectangular recess. The second rectangular recess thereby faces toward the carrier material. What is achieved by these techniques is that an arrangement of the individual elements of the corotron device is possible in a compact form. As a result of this arrangement, further, the effect of the non-uniform stray-electrical fields of the voltage supply unit and of the lines on the carrier material on the overall environment is slight. Given great distances between voltage supply unit and corotron wire insert, moreover, line losses occur that require a larger dimensioning of the voltage supply unit and thus lead to stronger stray fields.

In a further aspect of the embodiments, a corotron device is provided wherein the corotron wire is introduced into the corotron device with the assistance of a retainer element. The retainer element detaches from the corotron wire after the introduction of the corotron wire and is removed from the corotron device. At least one end of the corotron wire is arrested in the corotron device after the insertion of the corotron wire. The retainer element is again connected to the corotron wire and the arrest of the corotron wire in the corotron device is undone. The corotron wire is thus removed from the corotron device with the retainer element. What is thereby achieved is that the introduction and the removal of a corotron wire is unproblemmatically possible with the assistance of the retainer element, and that the risk of destroying the corotron wire upon introduction or upon removal is nearly precluded. The employment of this retainer element is especially advantageous given glass-lad corotron wires since the glass envelope can break due to the action of forces upon introduction and upon removal of the corotron wire. The removal of corotron wires with a broken glass envelope is thus also possible without risk of injury. The retainer element also serves as protection of the corotron wire during transport.

According to one embodiment, a drawn plastic profile is utilized as a retainer element, the length thereof being matched to the length of the corotron wire, whereby pegs are attached to the end pieces of the corotron wire that, together with recesses in the retainer element, produce a positive connection between retainer element and corotron wire. What is thereby achieved is that such a retainer element can be manufactured with few means. Due to the positive connection between the peg of the end pieces of the corotron wire and the retainer element, the longitudinal forces that act on the corotron wire during transport and/or upon introduction of the corotron wire are transmitted onto the retainer element, as a result whereof the risk of destruction of the corotron wire is considerably reduced.

According to a further aspect, a retainer element is provided whereby the corotron wire is accepted in an opening of the retainer element. The opening is formed by two arcuate legs that partially embrace the corotron wire when accepted in the retainer element, whereby the arcuate legs form resilient elements that fix the corotron wire with the end pieces in the retainer element. The assistance of this retainer element makes it possible to transport and handle glass-clad corotron wires in this retainer element dependedly and in protected fashion.

In the preferred embodiment, FIG. 1 shows a swiveling carrier 10 having two corotron arrangements 12a, 12b, whereby a corotron wire insert 14a is installed in the corotron arrangement. An identical corotron wire insert 14b (not shown) can likewise be arranged in the corotron arrangement 12b. The corotron arrangements 12a and 12b, including the corotron wire inserts 14a, 14b, are identically constructed. Elements that are described for a corotron wire insert 14a, 14b or a corotron arrangement 12a, 12b and/or are shown in the Figures are respectively valid for both arrangements.

An insert location 16b for a corotron wire insert 14b is provided at the corotron arrangement 12b. The corotron arrangements 12a, 12b are connected to one another by swiveling carrier boards 18a, 18b, which are also provided for accepting other elements such as, for example, character generators, cleaning units or further corotron arrangements. The carrier material, a photoconductor band 20 in this exemplary embodiment, for a latent image is conducted past under the swiveling carrier 10 in the direction of the arrow P1 as seen from this perspective. The swiveling carrier 10 can be arranged in an arbitrary attitude in the printer or copier.

The voltage supply units 22a, 22b are arranged above the corotron inserts 14a, 14b in the corotron arrangements 12a, 12b, the units 22a, 22b respectively containing a first power pack 24a, 24b for generating the corotron wire voltage and respectively containing a second power pack part 26a, 26b for generating a reflector voltage to be applied to the reflector. Connector elements 28a, 28b via which the ozone arising in the corotron arrangements 12a, 12b is supplied via channels to an ozone neutralizing unit are arranged at an end of each corotron arrangement 12a, 12b. The connector 28a, 28b are firmly connected to the corotron arrangements 12a, 12b. Two further connector elements 30a, 30b are firmly connected to the frame of the printer or copier. The connector elements 28a, 28b, 30a, 30b comprise bevels at their contacting surfaces with an angle of 45°, as a result of which a simple matching of the channel transition of the connector elements 28a, 28b, 30a, 30b to the position of the swiveling carrier 10 or to the position of the corotron arrangements 12, 12b is possible.

Retainer clamps 32a, 32b are provided at the corotron arrangements 12a, 12b, these respectively embracing an arrest peg 34 that is firmly arranged at the corotron wire insert 14a, 14b. The retainer clamps 32a, 32b make it more difficult to prove the respective corotron wire unit 14a, 14b out, as a result of which an adequate fastening of the respective corotron wire unit 14a, 14b in the corresponding corotron arrangement 12a, 12b is assured.

Figure 2:
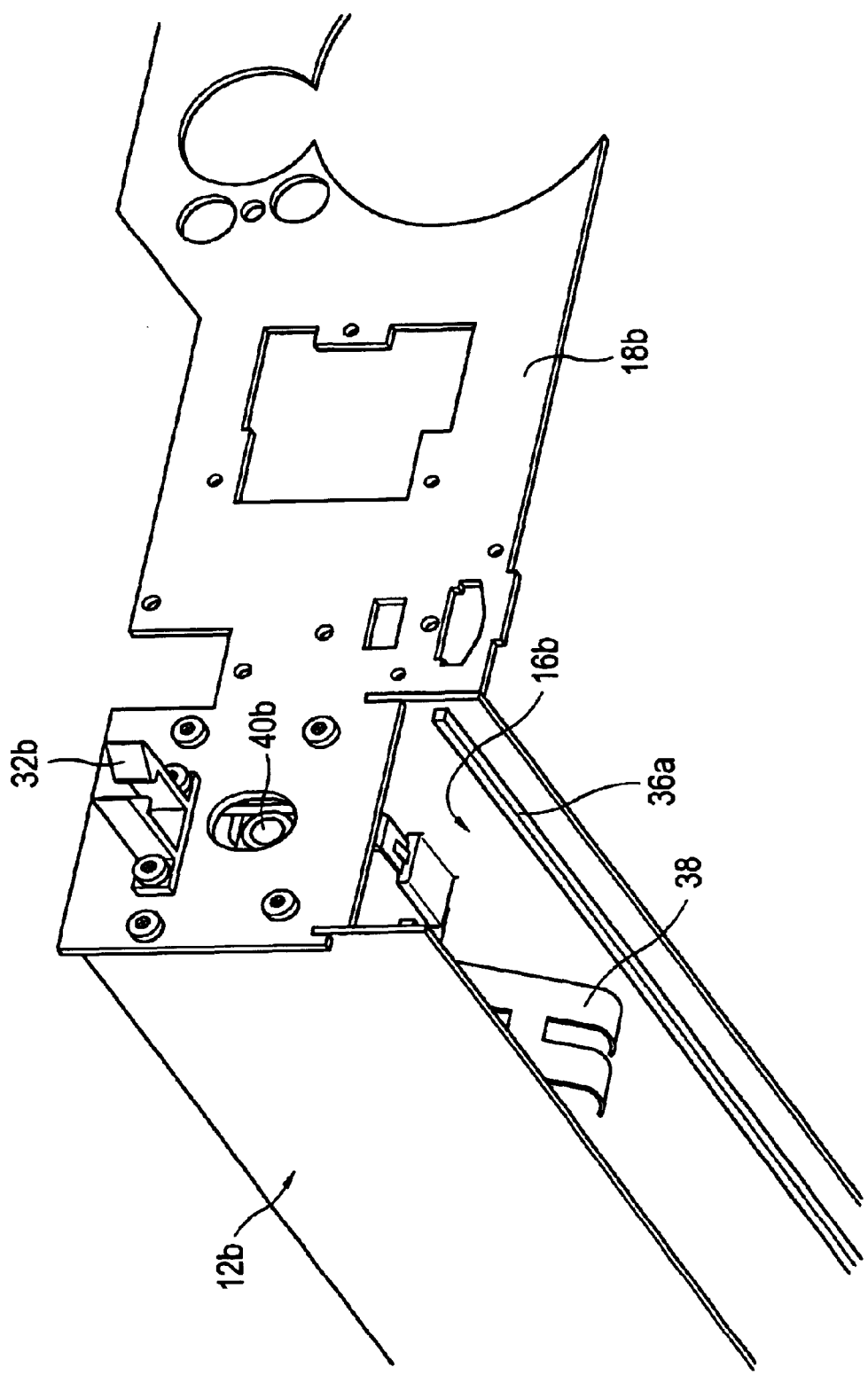
FIG. 2 is an excerpt of the swiveling carrier shown in FIG. 1 with the corotron arrangement without corotron inserts.

FIG. 2 shows an excerpt from the swiveling carrier 10 shown in FIG. 1 with the corotron arrangement 12b without corotron wire insert 14b. Identical elements have the same reference characters. As described in FIG. 1, the corotron arrangement 12b is connected to the swiveling carrier board 18b. Two guide rails 36a and 36b lying opposite one another are arranged in the insertion location 16b for the corotron wire insert 14b. Only one guide rail 36a is visible in this Figure. Further, a plurality of leaf springs 38 are arranged in the corotron arrangement 12b, these exerting a force in the direction of the photoconductor band 20 onto the corotron wire insert 14b in its installed condition. They thereby also produce electrically conductive connections to the reflectors (which are to be described later) of the corotron wire insert 14b. A vertically movable bushing 40b via which the voltage for the corotron wires is supplied is also provided at the illustrated corotron arrangement 12b.

Figure 3:
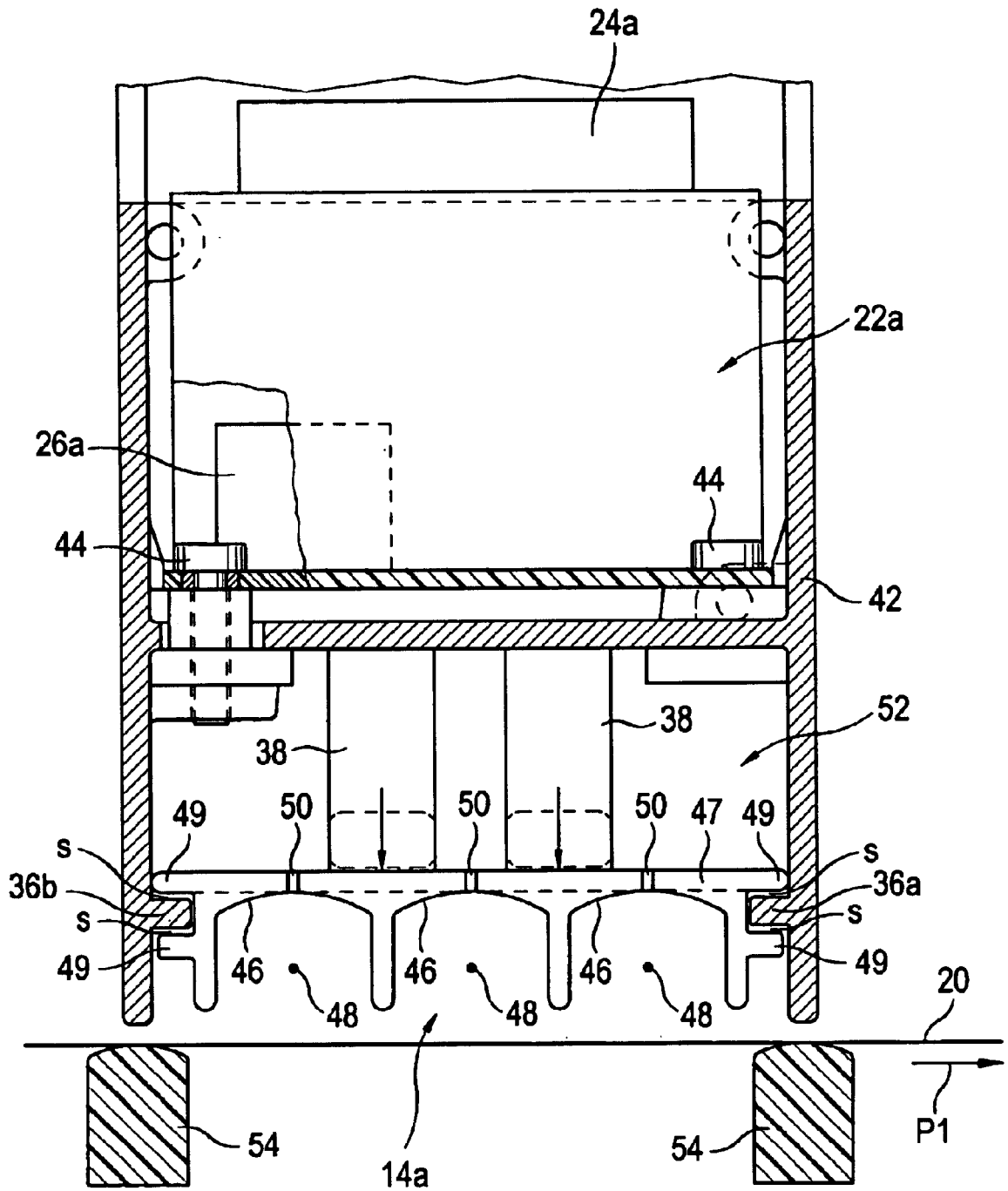
FIG. 3 is a section through the corotron arrangement, carrier, the voltage supply unit and the photoconductor band.

FIG. 3 shows a section through the corotron arrangement 12a, a carrier 42, the voltage supply unit 22a and the photoconductor band 20. The carrier 42 has a H-shaped cross-section in whose upper rectangular recess the voltage supply unit 28a with the first power pack 24a and the second power pack 26a is arranged. The voltage supply unit 22a is secured to the carrier 42 with screws 44. The corotron wire insert 14a is accepted in the carrier by the two guide rails 36a, 36b lying opposite one another that are arranged in the lower rectangular recess of the H-shaped carrier cross-section 42. The guide rails 36a, 36b are firmly connected to the carrier 42. The leaf spring 38 has its spring section exerting a force onto the surface of the corotron wire insert 14a in the direction of the photoconductor band 20. The corotron wire insert 14a has reflectors 46, whereby each reflector 46 surrounds the respective corotron wire 48 on three sides, and whereby the open, fourth side of the reflector 46 faces toward the photoconductor band 20. The reflectors 46 serve the purpose of shielding the electrical field. The corotron wire insert 14a has an extruded aluminum profile 47 as a bearing component part that respectively has a U-shaped lateral and whose legs 49 embrace the guide rail 36a, 36b with play s. As a result of the play s, the corotron wire insert 14a can move relative to the carrier 42 in the direction of the photoconductor band 20, so that the corotron wire insert 14a is given the possibility regardless of the exact position of the carrier 42 of seating on band bearing elements 54 or of being pressed onto the band bearing elements 54 by the spring power of the leaf spring 38.

Slots 52 for the extraction of the ozone are present at that side of the reflectors 46 lying opposite the photoconductor band 20. The ozone is extracted in the channel 52 formed by the corotron wire insert 14a and by the carrier 42 and is supplied to an ozone neutralizing unit.

The photoconductor band 20 is guided by the band bearing elements 54 that are arranged at that side of the photoconductor band 20 facing away from the corotron wires 48. The reflectors 46 have a corrosion-resistant surface that is preferably hard-chrome plated. The entire extruded aluminum profile 47 is preferably hard-chrome plated.

Figure 4:
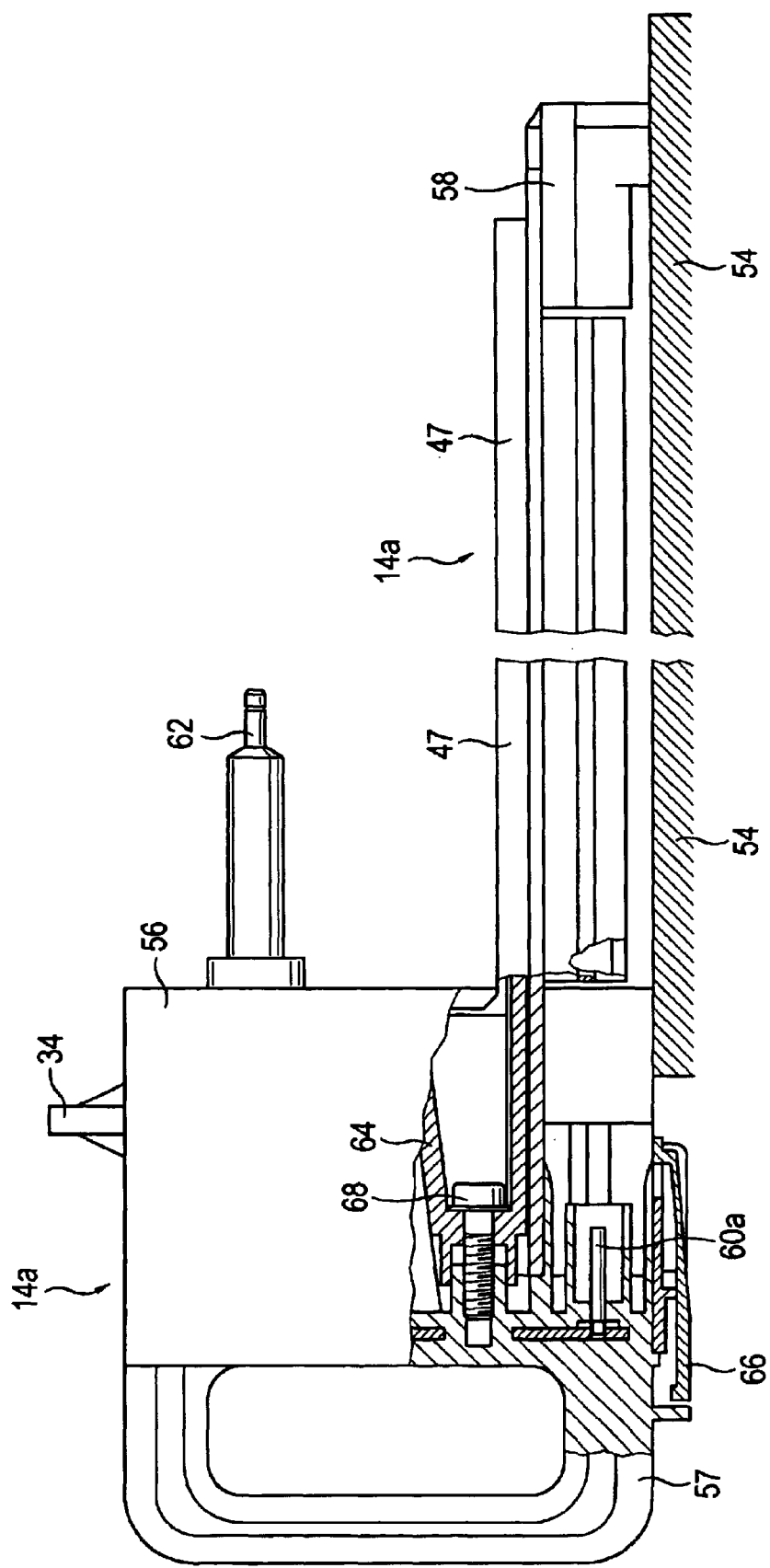
FIG. 4 shows the corotron wire insert with break lines in a partial view.

FIG. 4 shows the corotron wire insert 14a with breakage lines as a partial section. A distributor element 56 provided at one side has a handle 57 and is connected via the extruded aluminum profile 47 to a supporting element 58. The distributor 56 and the supporting element 58 lie on sections of the band bearing elements 54 that project beyond the width of the photoconductor band 20 at both sides. These band bearing elements 54 form the bearing for the distributor element 56 and for the supporting element 58. The longitudinal axis of the corotron wire 48 is thus always aligned in a plane parallel to the photoconductor 20.

Three contact pins 60a, 60b, 60c are arranged in the distributor element 56 that produce an electrically conductive connection to the three corotron wires 48 of the corotron wire insert 14a. The contact pins 60a, 60b, 60c in the distributor element 56 are electrically conductively connected to a contact pin 62 that produces an electrically conductive connection to the voltage supply unit 24a. Only one contact pin 60a is shown in this FIG. 4. The connection preferably occurs by stranded conductors or by means of a board in the distributor element 56. The bush 40a (which is not shown in this FIG. 4) for the acceptance of the contact pin 62 is movably arranged on the voltage supply unit 22a, so that a relative movement between corotron wire insert 14a and the carrier 42 to which the voltage supply unit 22a is firmly connected is possible. Such an arrangement is also referred to as a flying plug. As a result of the arrest peg 34, the entire corotron wire insert 14a is fixed in a position relative to the carrier 42 with the assistance of the retainer clamps 32a, whereby a movement of the corotron wire insert 14a in the direction of the photoconductor band 20 is possible. The extruded aluminum profile 47 is connected to the distributor element 56 with a wedge 64 and a fastening element 68. The corotron wires 48 are fixed by a lock mechanism 66 in the distributor element 56 and, thus, in the corotron wire insert 14a.

Figure 5:
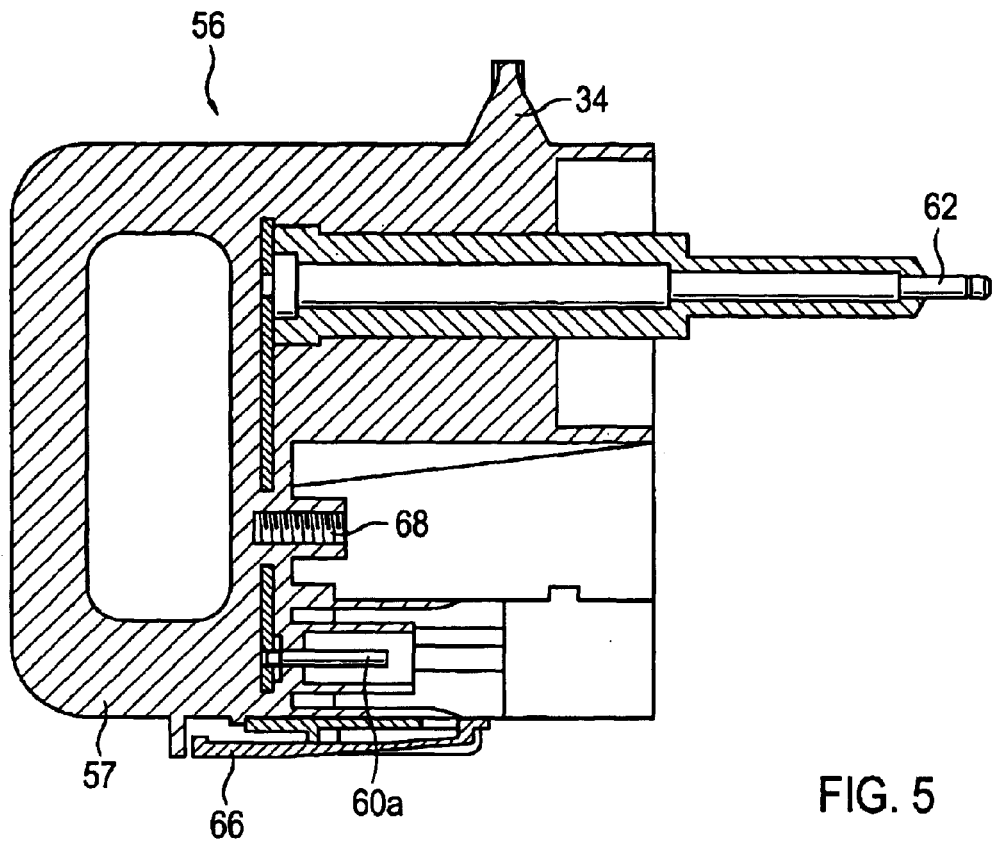
FIG. 5 shows the distributor element in a full section.

FIG. 5 shows the distributor element 56 in a full section. The extruded aluminum profile 47 is connected to the distributor element 56 with the assistance of the fastening element 68.

Figure 6:
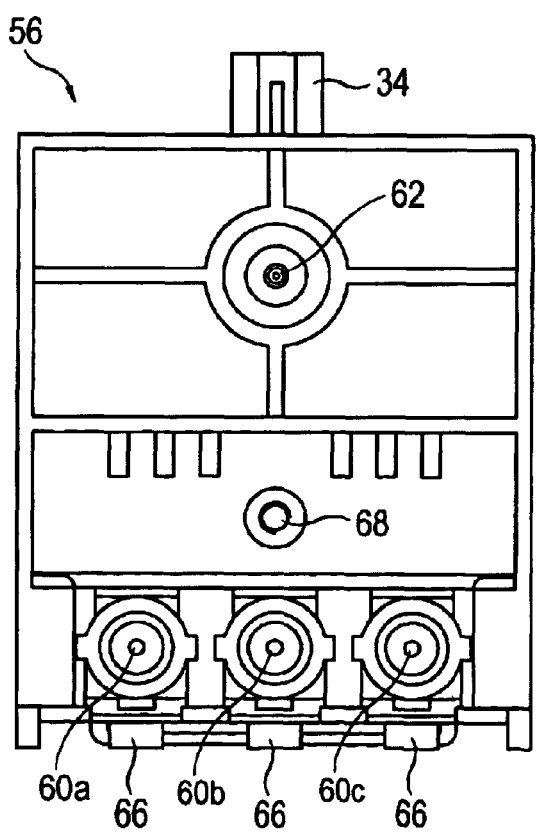
FIG. 6 illustrates the distributor element of the corotron wire insert from FIGS. 4 and 5 in a view turned by 90°.

FIG. 6 shows the distributor element 56 of the corotron wire insert 14a, from FIGS. 4 and 5 in a view that is turned by 90°. The recesses that accept the three contact pins 60a, 60b, 60c in the distributor element 56 also serve for the acceptance of end pieces of the three corotron wires 48.

Figure 7:
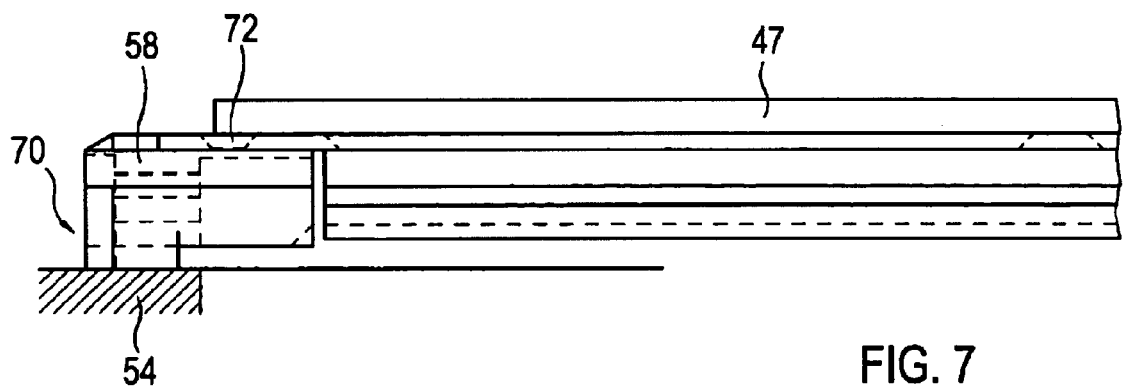
FIG. 7 shows the extruded aluminum profile of the corotron wire insert with the band seating element as a bearing in a partial view.

In FIG. 7, the extruded aluminum profile 47 of the corotron wire insert 14a is shown with the band bearing element 54 as a bearing. The supporting element 58 of the corotron wire insert 14a is firmly connected to the extruded aluminum profile 47. It is comprised of an insulating material, for example of an insulating plastic. A respective end of the corotron wires 48 is held in the supporting element 58. The extruded aluminum profile 47 is connected to the supporting element 58 by fastening elements 72.

Figure 8:
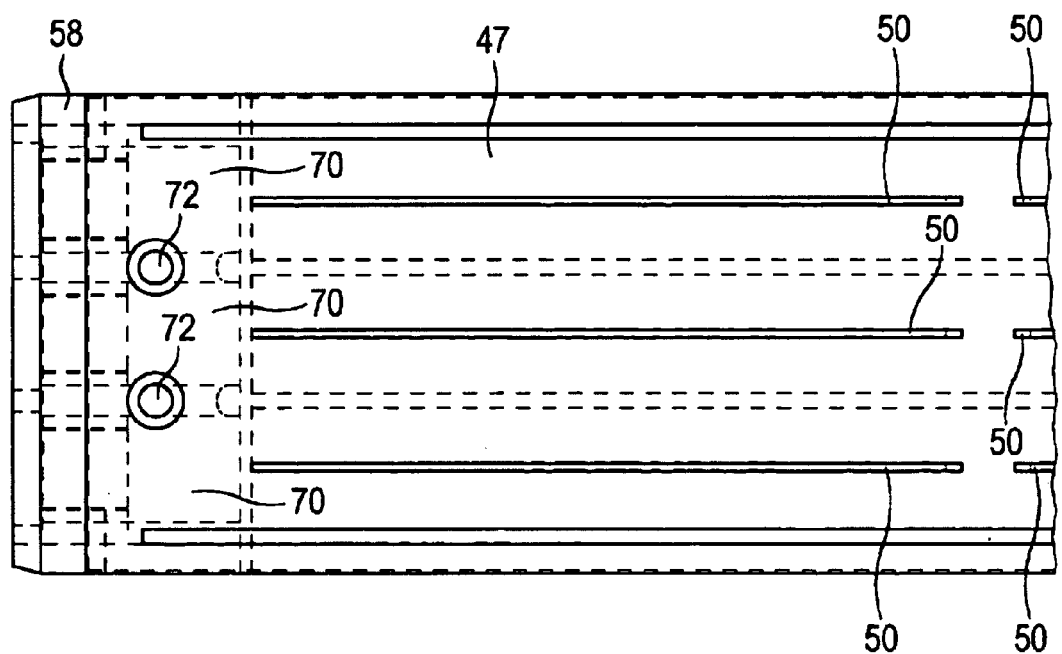
FIG. 8 shows the partial view of the extruded aluminum profile from FIG. 7 in a view of this arrangement turned by 90°.

FIG. 8 shows the extruded aluminum profile 47 from FIG. 7 in a view that is turned by 90°. The ozone is extracted through the slots 50. Openings 70 in the supporting element 58 serve for the acceptance of the end bushes of the corotron wires 48.

Figure 9:
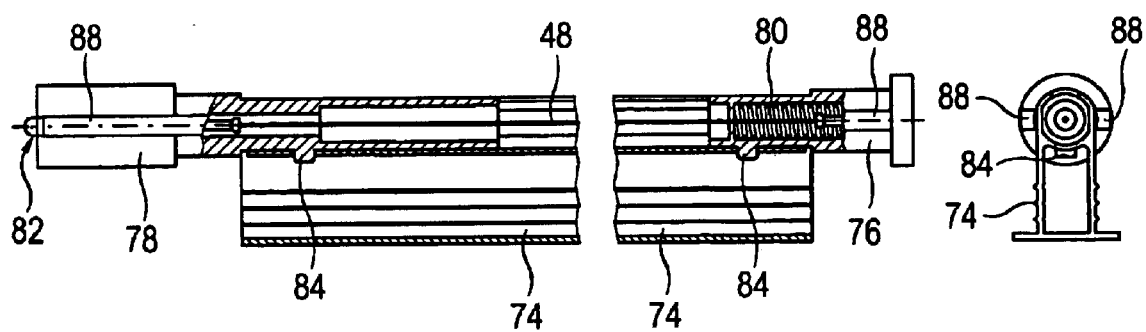
FIG. 9 illustrates the corotron wire in the retainer element in a partially cut illustration as well as in a view of this arrangement that is turned by 90°.

FIG. 9 shows the corotron wire 48 in a retainer element 74 as well as a view of this arrangement that is turned by 90°. The corotron wire 48 and the retainer element 74 are partially cut in this illustration. A respective end piece 76, 78 is attached to both ends of the corotron wire 48. The corotron wire 48 is glass-clad and forms a unit together with the end pieces 76, 78. The end piece 78 has a bushing 82 via which the contact pin 60a (not shown in this FIG. 9) of the distributor element 56 produces an electrically conductive connection to the corotron wire 48. A spring 80 that keeps the corotron wire 48 under a constant mechanical tension is in the inside of the end piece 76. A respective peg 84 that engages into respective opening (explained in greater detail in FIG. 10) of the retainer element 74 is attached to the end pieces 76, 78. Further, two guide elements 88 are arranged at each end piece 76, 78, these guiding the corotron wire 48 in the distributor element 56 and in the openings 70 of the supporting element 58.

Figure 10:
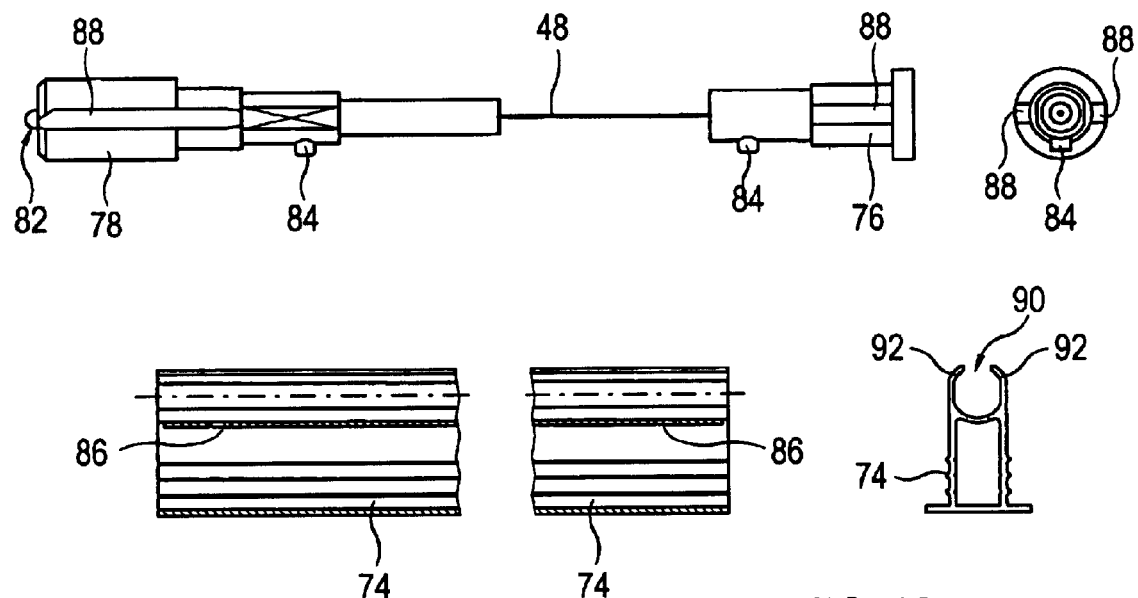
FIG. 10 shows the corotron wire with the end pieces from FIG. 9 in a non-cut illustration with the retainer element shown cut and separated from the corotron wire as well as a view of this arrangement that is turned by 90°.

FIG. 10 shows the corotron wire 48 with the end pieces 76, 78 of FIG. 9 in a non-cut illustration with the retainer element 74 shown cut and separated from the corotron wire 48, and also shows a view of this arrangement that is turned by 90°. The retainer element 74 is comprised of a drawn plastic profile having an opening 90 for accepting the corotron wire 48. The opening 90 is formed by two arcuate legs 92 that partially embrace the corotron wire 48 when accepted in the retainer element 74. The arcuate legs 92 form resilient elements that fix the corotron wire 48 in the retainer element 74.

Figure 11:
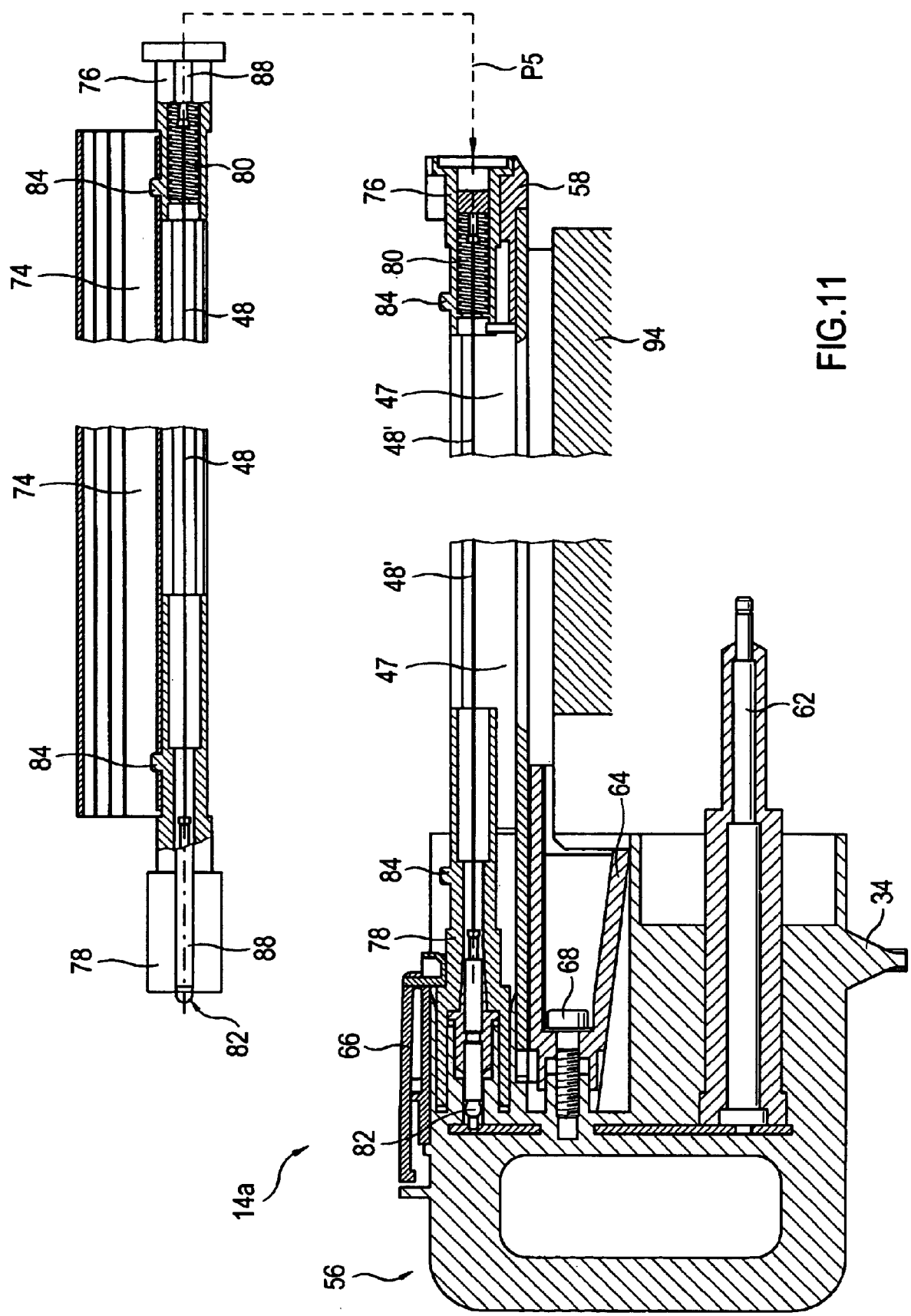
FIG. 11 illustrates the corotron wire insert and the corotron wire in the retainer element.

FIG. 11 shows the corotron wire insert 14a and the corotron wire 48 in the retainer element 74. The corotron wire insert 14a has been removed from the printer or copier and is on an assembly table 94 for the mounting of the corotron wires 48, so that the corotron wires 48 are visible to a service technician and are easily accessible. The insertion procedure of the corotron wire 48 into the corotron wire insert 14a is indicated by the arrow P5. For insertion into the corotron wire insert 14a, the corotron wire 48 to be inserted together with the end pieces 76, 78 is in the holding mechanism 74, whereby the pegs 84 fix the end pieces 76, 78 of the corotron wire 48 in the holding element 74. Using the holding element 74, the fixed corotron wire 48 is introduced into the corotron wire insert 14a along the line of the arrow P5 until the corotron wire 48' with its end pieces 76', 78' is fixed in the corotron wire insert 14a by the arrest element 66. After the corotron wire 48 has been fixed in the corotron wire insert 14a, the holding element 74 is removed upwardly out of the corotron wire insert 14a. The corotron wire 48 has been inserted operationally ready. Due to the shape of the extruded aluminum profile 47 and the free accessibility established as a result thereof, the extruded aluminum profile 47 with the reflectors 46 can be easily cleaned when replacing the corotron wires 48.

Figure 12:
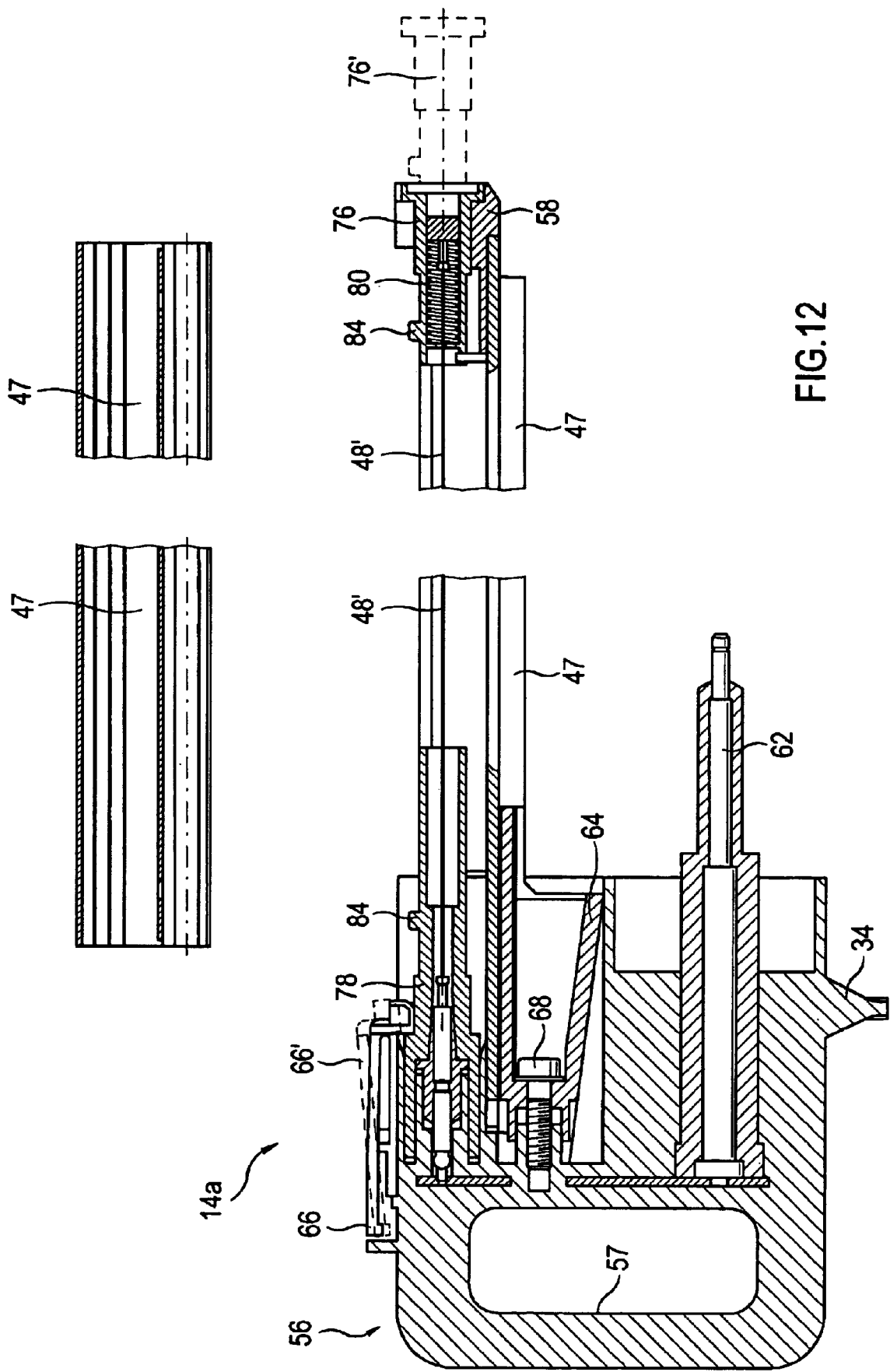
FIG. 12 shows the corotron wire insert with the introduced corotron wire as well as the retainer element of FIG. 11.

FIG. 12 shows the corotron wire insert 14a with the introduced corotron wire 48 as well as the holding element 74 from FIG. 11. How the corotron wire 48 is introduced into or removed from the corotron wire insert 14a is shown in this Figure. For that purpose, the corotron wire 48 in the holder element 74 is introduced into the opening 70 of the support element 58 along the arrow P5 shown in FIG. 11 with an offset relative to the distributor element 56 and parallel to the extruded aluminum profile 47. The end piece 76 of the corotron wire 48 thereby assumes the position 76'. Subsequently, the holding element 74 together with the corotron wire 48 and the end pieces 76, 78 thereof are pushed in the direction of the distributor element 56, whereby the contact pin 60a (not shown) is introduced into the bushing 82 of the end piece 78. The arrest element 66 is deflected into the position 66' by the end piece 78 upon introduction of the corotron wire into the corotron wire unit 14a and subsequently locks the corotron wire 48 in the final attitude 66.

The arrest element 66 is preferably held in its final attitude by a spring element. Subsequently, the holding element 74 is removed from the corotron wire 48. For removing the corotron wire 48, the holding element 74 is shoved onto the corotron wire 48, so that the arcuate legs 92 of the holding element 74 partially embrace the corotron wire 48 and the pegs 84 of the end pieces 76 and 78 fix the corotron wire 48 in the holder element 74. Subsequently, the arrest element 66 is brought into the position 66', the holding element 74 together with the corotron wire 48 is displaced parallel to the extruded aluminum profile 47 in the direction of the supporting element 58 until it is in the position 76' of the end piece 76 and is subsequently removed from the corotron wire unit 14a.

Figure 13:
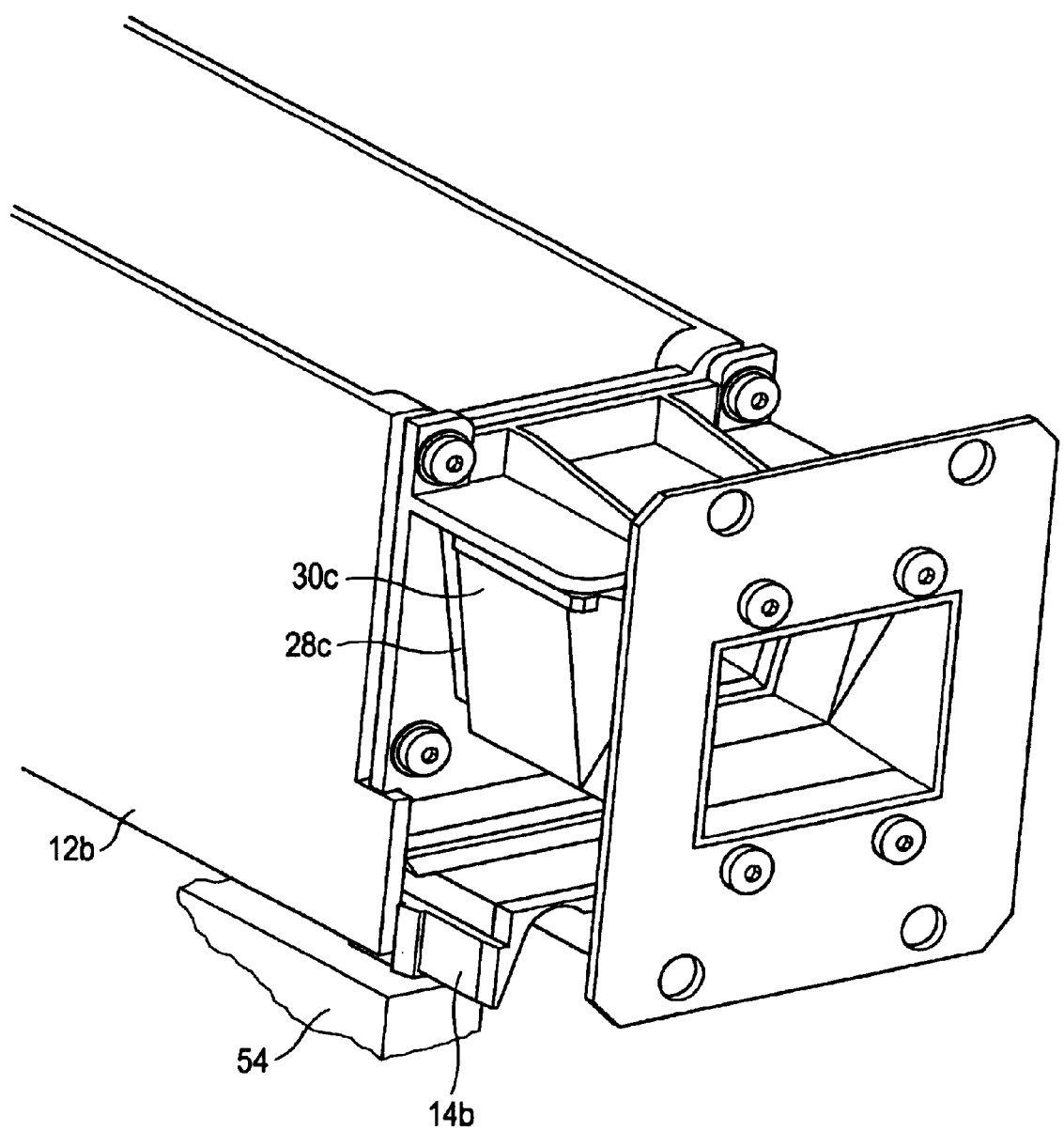
FIG. 13 is a perspective, partial view of the corotron arrangement in its operating attitude.

FIG. 13 shows a perspective, partial view of the corotron arrangement in its operating attitude. The corotron wire insert 14b arranged in the corotron arrangement 12b is seated on the bearing element 54 that aligns the corotron wire insert 14b in a parallel plane relative to the photoconductor band 20 (not shown in this FIG. 13). The corotron arrangement 12b with the corotron wire insert 14a is in its operating attitude, i.e. the corotron wire insert 14b is aligned by the bearing elements 54 in a correct distance parallel from the photoconductor band 20.

Further, a connector element 28c is firmly connected to the corotron arrangement 12b and a second connector element 30c is firmly connected to the housing of the printer and/or copier. The connector elements 28c and 30c in this modified embodiment replace the connector elements 28a, 28b, 30a, 30b shown in FIG. 1, whereby the connector elements 28a, 28b are each respectively replaced by a connector element 28c and the connector elements 30a, 30b are each respectively replaced by a connector element 30c. The connector elements 28c and 30c have a symmetrical, trapezoidal cross-section, whereby the downwardly directed outside surfaces of the connector element 28c form seal surfaces with the upwardly directed inside surfaces of the connector element 30c, these seal surfaces forming a tight arrangement due to the overlapping contact. The ozone-air mixture arising in the corotron arrangement 12b is extracted via the connection created by the connector elements 28c, 30c and is supplied to an ozone neutralizing unit. Endangerment of persons due to emerging ozone is thus reliably prevented.

Figure 14:
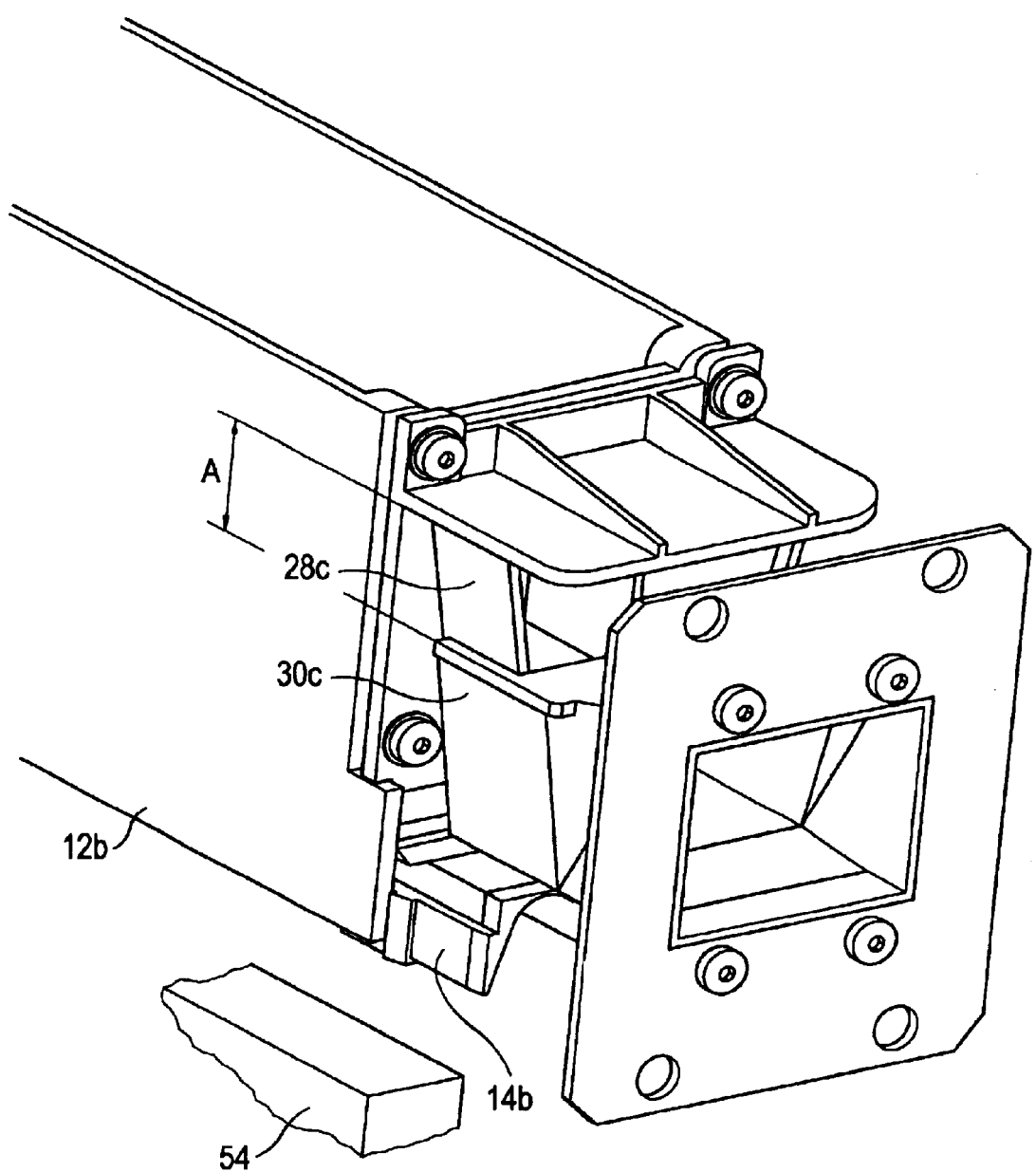
FIG. 14 is a perspective, partial view of the corotron arrangement in its standby position.

FIG. 14 shows a perspective, partial view of the corotron arrangement from FIG. 13 in the maintenance position. In the maintenance position, the corotron wire unit 12b together with the corotron wire insert 14b has been lifted up by the distance A from the bearing elements 54. For that purpose, all elements and arrangements (see FIG. 1) connected to the swiveling carrier boards 18a, 18b are moved away from the photoconductor band 20 via a lever system (not shown). The lever system is only accessible when the printer or copier housing has been opened. The lift-off particularly serves the purpose of assuring access during maintenance jobs or, respectively, mounting freedom for the elements arranged at the swiveling carrier boards 18a, 18b and for the photoconductor 20. As a result of being lifted off, the seal surfaces of the connector elements 28c, 30c no longer touch and can be freely moved relative to one another. When the corotron arrangement 12b is lowered, the seal surfaces of the connector elements 28c and 30c contact one another again, so that the channel 52 of the corotron arrangement 12b for extracting the ozone through the connector elements 28c, 30c, is again tightly connected to the ozone neutralizing unit.

Figure 15:
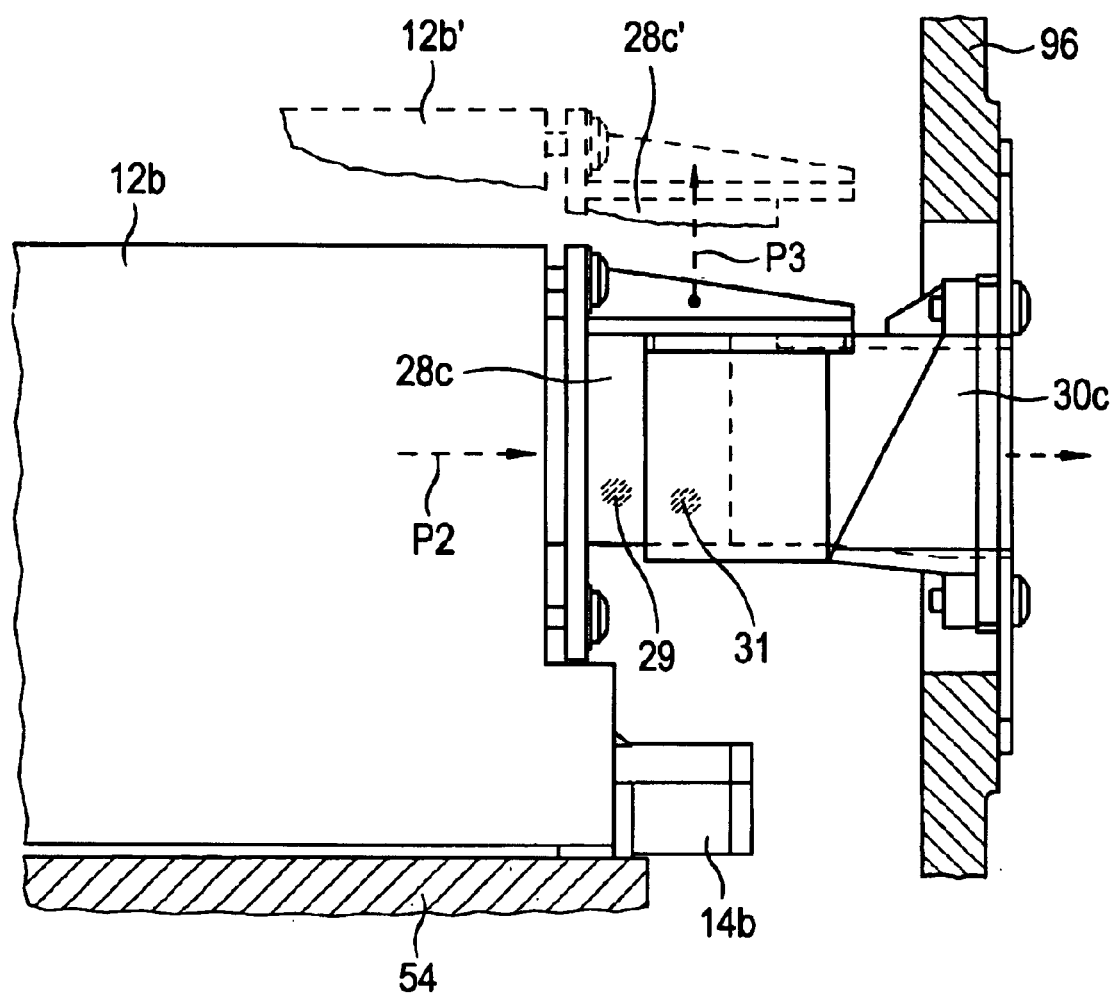
FIG. 15 is a partial view of the corotron arrangement in operating attitude.

FIG. 15 shows a partial view of the corotron arrangement in its operating attitude. The connector element 30c is thereby firmly connected to the printer or copier housing 96. The outside of the connector element 28c forms a seal surface 29, and the inside of the connector element 30c forms a seal surface 31. When the seal surfaces 29, 30 touch in overlapping fashion, they enable a tight connection between the corotron arrangement 12b and the ozone neutralizing unit. The ozone neutralizing unit extracts the ozone-air mixture in the corotron arrangement 12b in the arrow direction of the arrow P2. When, as described in FIG. 14, the corotron arrangement 12b is lifted into the maintenance position, whereby the corotron arrangement 12b together with the connector element 28c is moved in the arrow direction of the arrow P2, the corotron arrangement and the connector element assume the positions 12b' and 28c'.

Figure 16:
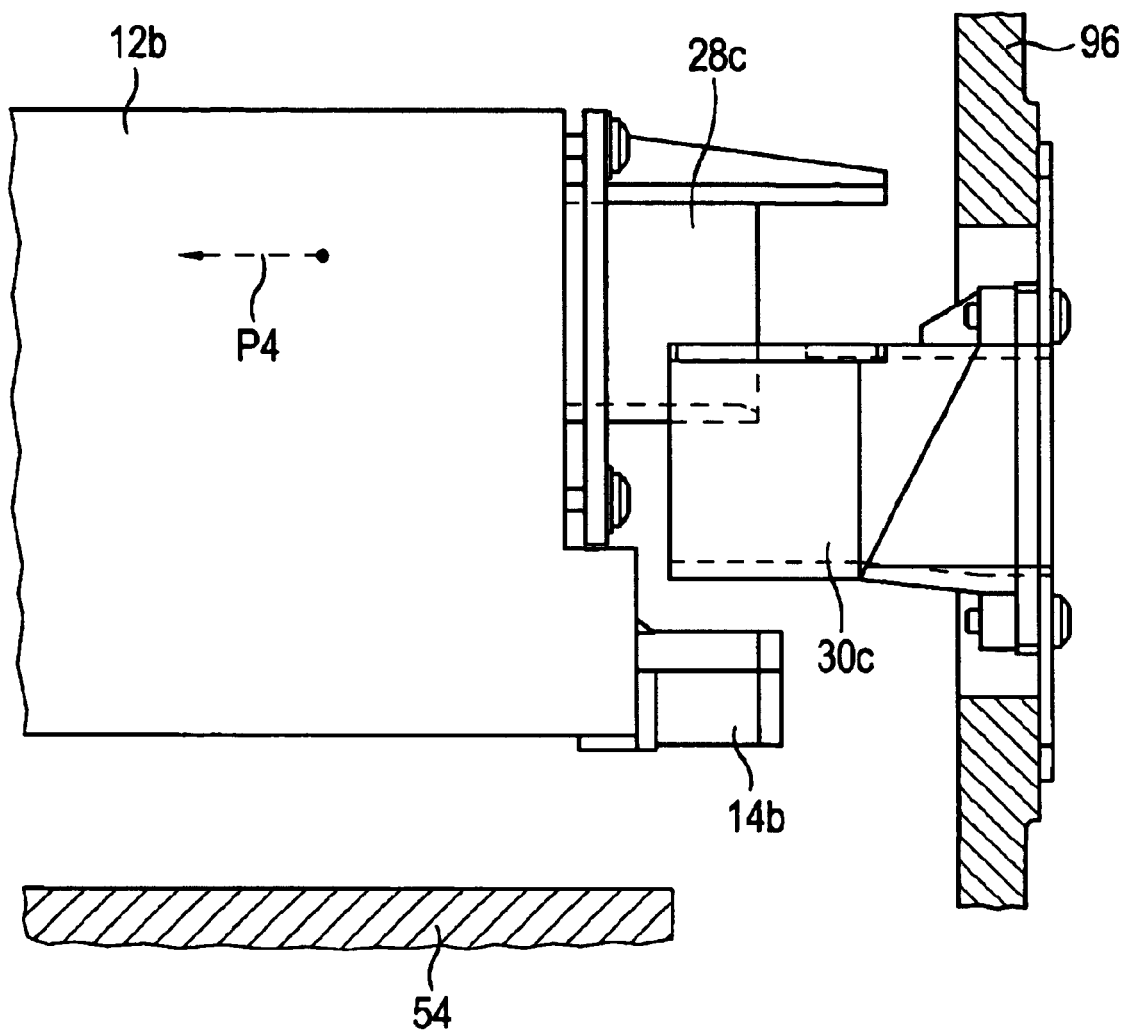
FIG. 16 is a partial view of the corotron arrangement in standby position.

FIG. 16 shows a partial view of the corotron arrangement in the maintenance position. The arrow P4 indicates an additional motion possibility of the corotron arrangement 12b that is established in the maintenance position.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

What is claimed is:

1. A corotron for electrographic processes in a printer or copier, comprising:
    at least one corotron wire held by a corotron wire insert and past which a carrier material for a latent image residing there opposite is conducted;
    a guide element with which the carrier material is guided;
    the carrier material and corotron wire lying in planes arranged substantially parallel to one another;
    the corotron wire insert lying on bearings at at least two bearing points, said bearings being rigidly connected to the guide element and being pressed onto the bearings with a spring power; and
    the corotron wire insert is guided in guide elements, the guide elements and the corotron wire insert having play in a direction of the carrier material, and the corotron wire insert lying on the bearings at said bearing points that are arranged at both sides of the carrier material.

2. The corotron according to claim 1 wherein the corotron wire insert is pressed onto the bearings with a spring, and the corotron wire insert is fixed by the spring in a plane parallel to the carrier material.

3. The corotron according to claim 1 wherein the corotron wire insert is guided by guide elements in a carrier.

4. An arrangement for a corotron for electrographic processes in a printer or copier, comprising:
    a carrier in which a corotron wire supplied with an electrical high-voltage is arranged;
    at least one voltage supply unit that generates the high voltage;
    the carrier accepting the voltage supply unit;
    the corotron wire in the carrier being arranged in a corotron wire insert; and
    an electrical connection between the voltage supply unit and the corotron wire insert containing at least one plug-type connector that is movably arranged so that the corotron wire insert is movable in the carrier in a connected condition of the plug-type connector.

5. The arrangement according to claim 4 wherein three corotron wires are arranged in the corotron wire insert.

6. The arrangement according to claim 4 wherein the voltage supply unit is arranged along the corotron wire insert.

7. The arrangement according to claim 4 wherein the corotron wire insert contains a reflector element, the reflector element being electrically connected to the voltage supply unit.

8. The arrangement according to claim 7 wherein the reflector element comprises an extruded aluminum profile that is hard-chrome plated.

9. The arrangement according to claim 4 wherein the corotron wire insert is guided in guide elements, and the guide elements and the corotron wire insert have play in a direction of a plane parallel to the corotron wires.

10. The arrangement according to claim 4 wherein the spring power of at least one spring acts on the corotron wire insert.

11. The arrangement according to claim 10 wherein the spring electrically connects the reflector element to the voltage supply unit.

12. The arrangement according to claim 4 wherein the reflector element is arranged isolated from a potential of further elements of the printer or copier by electrically insulating elements.

13. The arrangement according to claim 7 wherein the reflector element contains slots through which gas at least one of escapes and is extracted.

14. The arrangement according to claim 7 wherein the reflector element comprises an extruded profile.

15. The arrangement according to claim 13 wherein a channel for the extraction of the gas is connected by connector elements to an ozone neutralizing unit.

16. The arrangement according to claim 15 wherein a side of the corotron wire insert facing away from the corotron wires and the carrier forms the channel.

17. The arrangement according to claim 15 wherein the connector elements have seal elements at contacting surfaces thereof.

18. The arrangement according to claim 15 wherein the connector elements have surfaces that overlap one another.

19. The arrangement according to claim 15 wherein the connector elements have a trapezoidal cross-section.

20. The arrangement according to claim 4 wherein a plurality of corotron wire inserts are provided; and each corotron wire insert is fed by a separate voltage supply unit.

21. The arrangement according to claim 7 wherein the voltage supply unit contains at least two power pack parts, one power pack part serving for supply of the corotron wire and a second power pack part serving for supply of the reflector element.

22. The arrangement according to claim 4 wherein the corotron wire is supplied with a voltage in a range from 16 to 20 kV, and having a frequency in a range from 3 to 5 kHz.

23. The arrangement according to claim 7 wherein the reflector element is supplied with a D.C. voltage in a range from 3 to 5 kV.

24. The arrangement according to claim 4 wherein at least one distributor element is attached to the corotron wire insert, said at least one distributor element serving, on the one hand, as a mechanical actuation element for handling the corotron wire insert and, on the other hand, as an insulated electrical plug-type connector for connecting the voltage supply unit to the corotron wire.

25. The arrangement according to claim 24 wherein the plug-type connector is resiliently seated on one of the voltage supply unit and the distributor element.

26. The arrangement according to claim 4 wherein the carrier comprises an insulated plastic and has an H-shaped cross-section; and the voltage supply unit is arranged in a first rectangular recess of an H-shaped profile and the corotron wire insert is arranged in a second rectangular recess.

27. The arrangement according to claim 4 wherein the corotron wire insert is guided in the carrier by guide elements and the carrier is arranged in a pivotable arrangement.

28. A corotron insert into which a corotron wire is introduced with the assistance of a retainer element, comprising:

the retainer element being detached from the corotron wire after insertion of the corotron wire, said retainer element being removed from the corotron insert;

at least one end of the corotron wire is arrested in the corotron insert after insertion of the corotron wire;

the retainer is reconnectible with the corotron wire;

arrest of the corotron wire in the corotron insert is releasable; and the corotron insert wire with the retainer element is removable from the corotron.

29. The insert of claim 28 wherein the retainer element contains a drawn plastic profile.

30. The insert of claim 28 wherein a length of the retainer element is matched to an installed length of the corotron wire.

31. The insert according to claim 28 wherein pegs are attached to end pieces of the corotron wire, said pegs, together with recesses in the retainer element, producing a positive connection between the retainer element and the corotron wire.

32. The insert according to claim 28 wherein the corotron wire is a glass-clad corotron wire.

33. A retainer element for insertion and removal of a corotron wire in a corotron device, comprising:

an opening for acceptance of a corotron wire provided with end pieces;

the opening being formed by two arcuate legs that partially embrace the end pieces and the corotron wire being arranged between the end pieces upon insertion;

the arcuate legs forming spring elements that fix the end pieces with the corotron wire in the retainer element; and guide elements operating with the corotron device for longitudinal insertion of the end pieces and corotron wire into the corotron device.

34. The retainer element according to claim 33 wherein a drawn plastic profile is provided.

35. The retainer element according to claim 33 wherein a length of the retainer element is matched to an installed length of the corotron wire.

36. The retainer element according to claim 33 wherein recesses are provided that positively connect pegs arranged at end pieces to the retainer element.

37. A corotron for electrographic processes in a printer or copier, comprising:

at least one corotron wire held by a corotron wire insert and past which a carrier material for a latent image residing there opposite is conducted;

a guide element with which the carrier material is guided;

the carrier material and corotron wire lying in planes arranged substantially parallel to one another;

the corotron wire insert lying on bearings, said bearings being connected to the guide element and being pressed onto the bearings; and the corotron wire insert is guided in guide elements, the guide elements and the corotron wire insert having play in a direction of the carrier material, and the corotron wire insert lying on the bearings at said bearing points that are arranged at both sides of the carrier material.

38. A method for introduction and removal of a corotron wire into and from a corotron device, comprising the steps of:

holding the corotron wire with assistance of a retainer element during introduction into the corotron device;

upon introduction of the corotron wire in the corotron device, arresting at least one end of the corotron wire;

removing the retainer element from the corotron wire after the arrest; and for removal of the corotron wire, connecting the corotron wire in the corotron device to the retainer element;

undoing an arrest of an end of the corotron wire in the corotron device; and removing the corotron wire together with the retainer element from the corotron device.

39. A method for removal of a corotron wire from a corotron device, comprising the steps of:

connecting corotron wire in corotron device to retainer element;

un-doing an arrest of an end of the corotron wire in the corotron device; and removing the corotron wire together with the retainer element from the corotron device.

* * * * *